Figure 5:
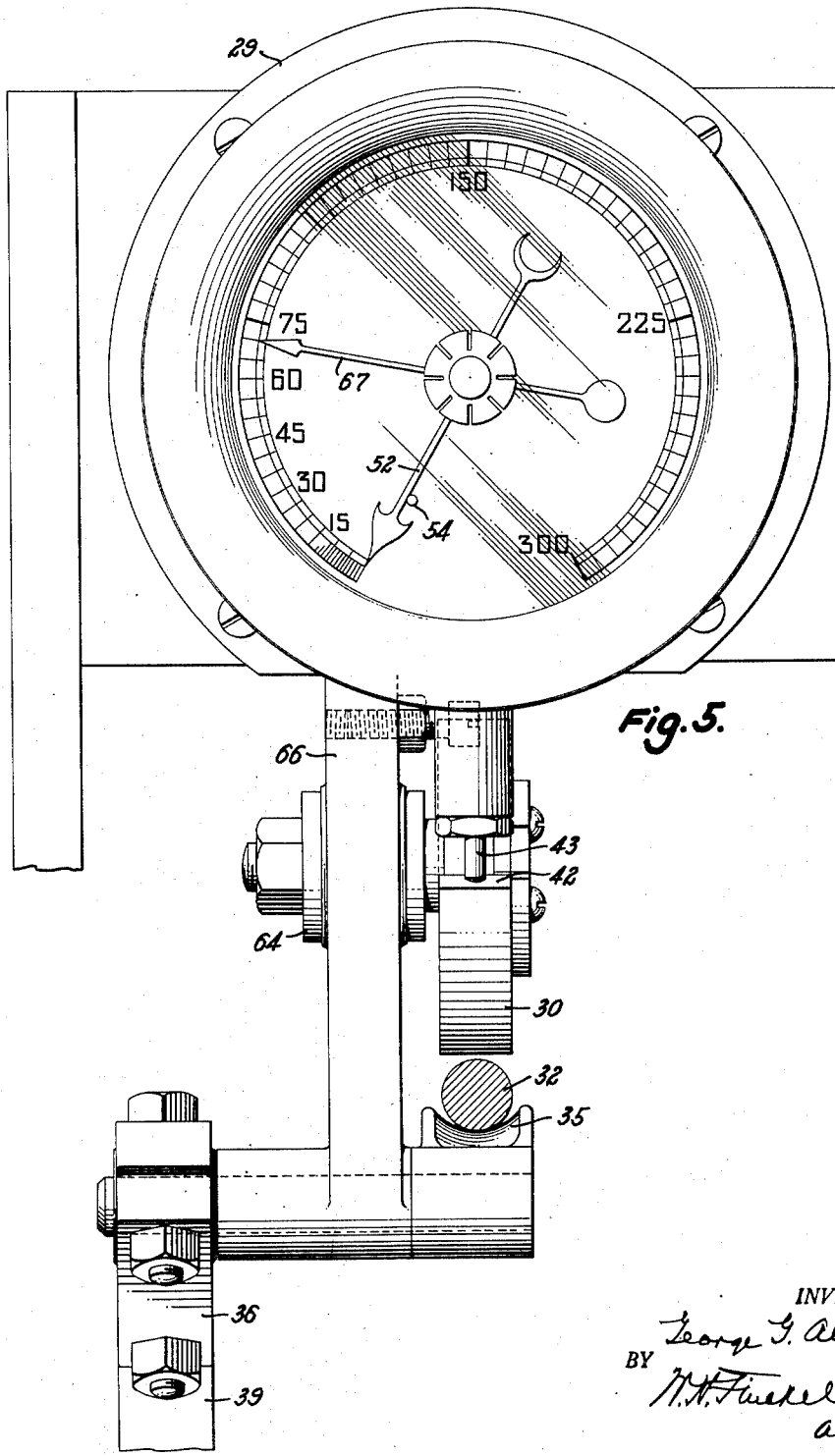

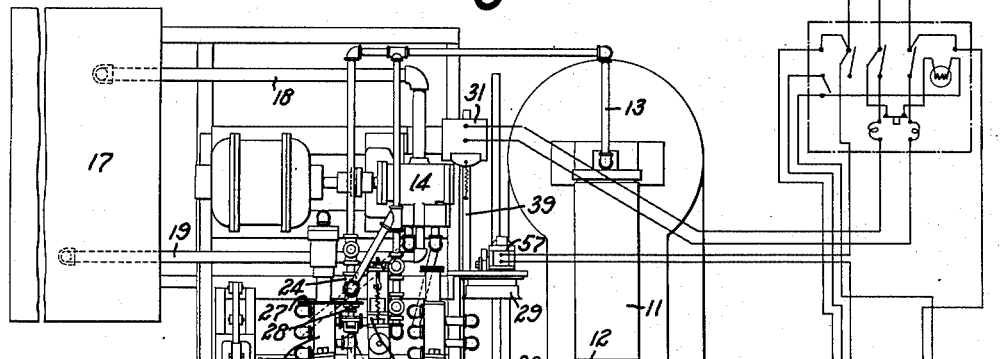
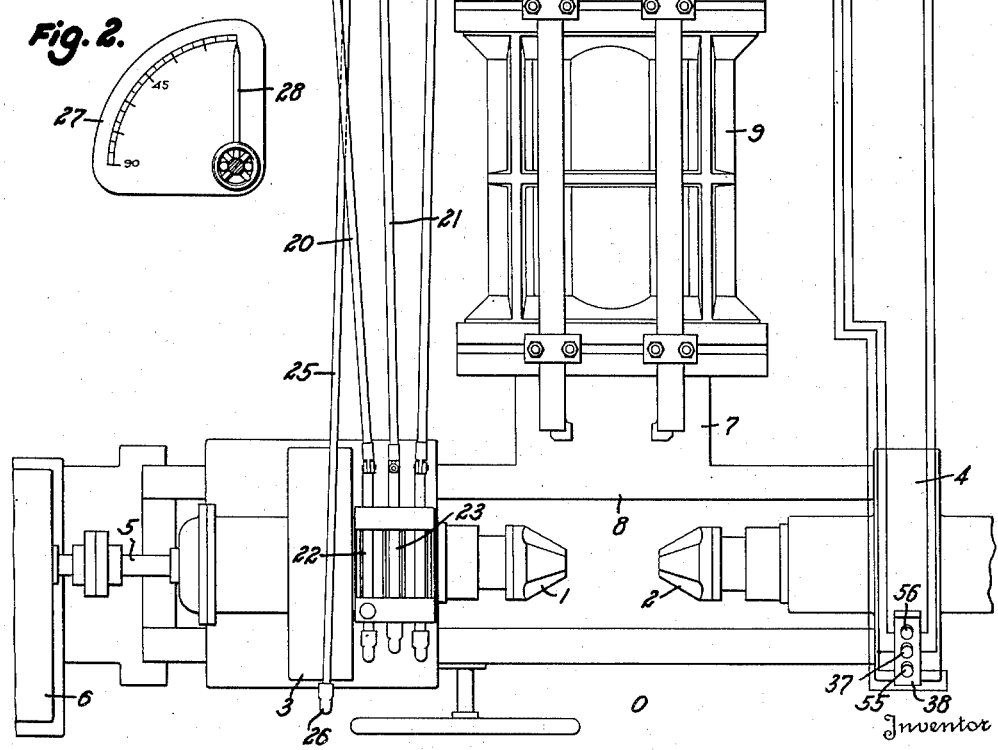

Dec. 26, 1950 G. G. ALLENBAUGH 2,535,826
INDICATING DEVICE
Filed April 5, 1946 6 Sheets-Sheet 2
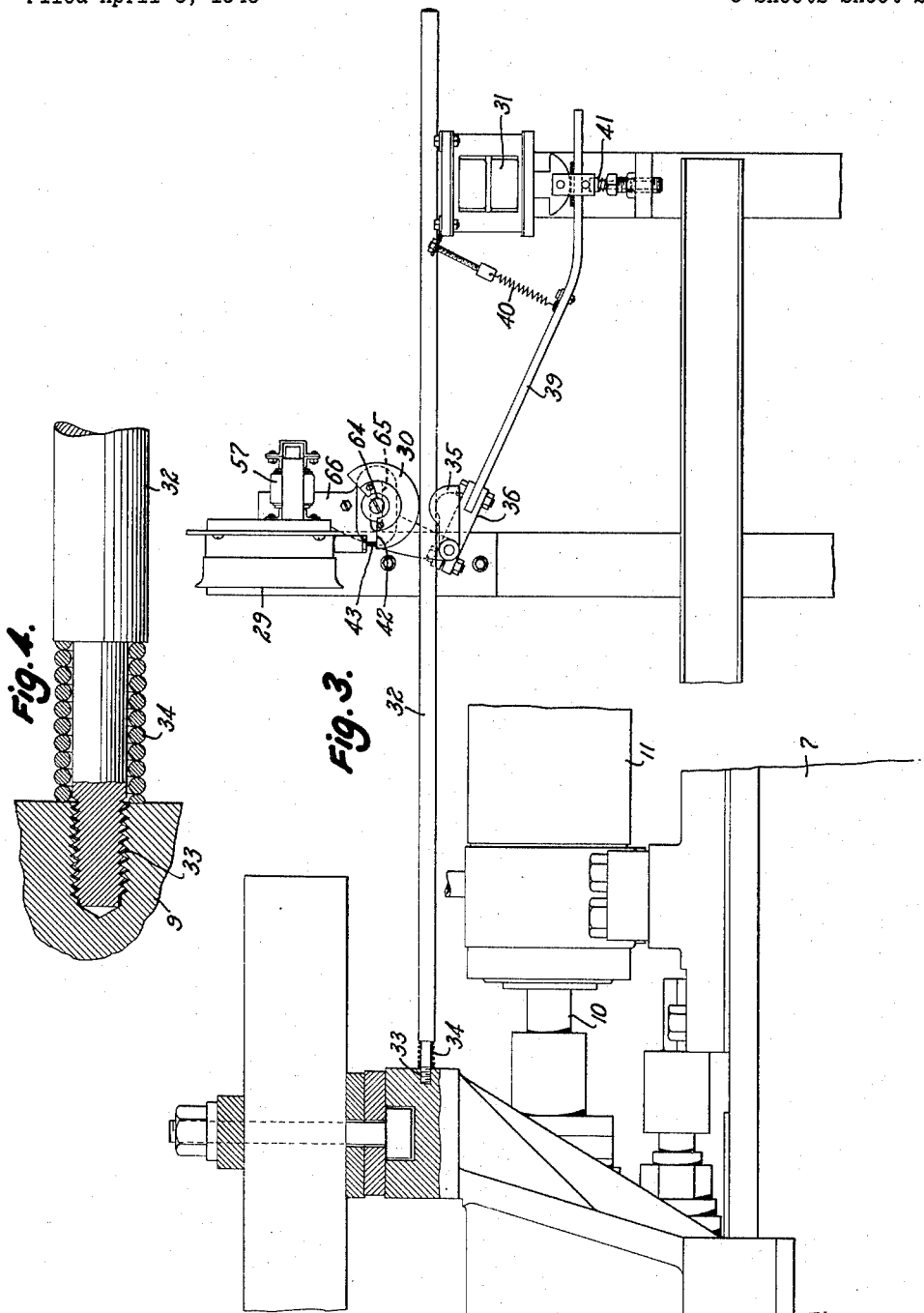
INVENTOR.
George G. Allenbaugh
BY
att.

Dec. 26, 1950 G. G. ALLENBAUGH 2,535,826
INDICATING DEVICE
Filed April 5, 1946 6 Sheets-Sheet 3

INVENTOR.
George G. Allenbaugh
BY
atty.

Dec. 26, 1950   G. G. ALLENBAUGH   2,535,826
INDICATING DEVICE

Filed April 5, 1946   6 Sheets-Sheet 4

INVENTOR.
George G. Allenbaugh

Dec. 26, 1950 — G. G. ALLENBAUGH — 2,535,826
INDICATING DEVICE
Filed April 5, 1946 — 6 Sheets-Sheet 5

INVENTOR.
George G. Allenbaugh
BY
atty.

Dec. 26, 1950        G. G. ALLENBAUGH        2,535,826
INDICATING DEVICE
Filed April 5, 1946                      6 Sheets-Sheet 6
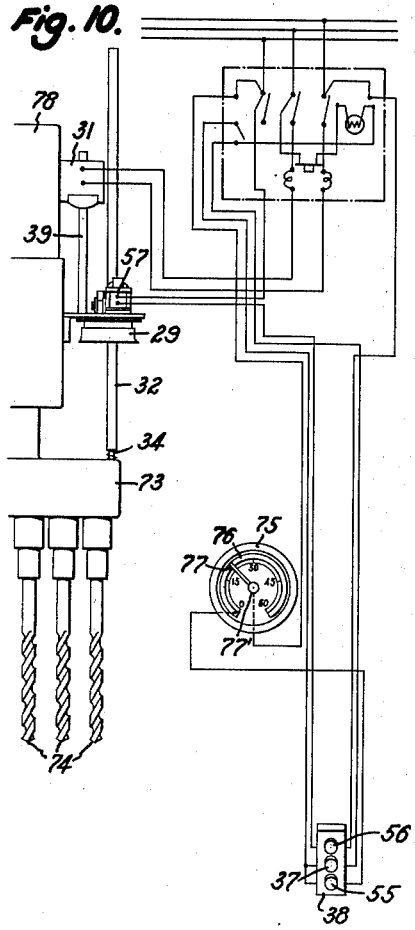
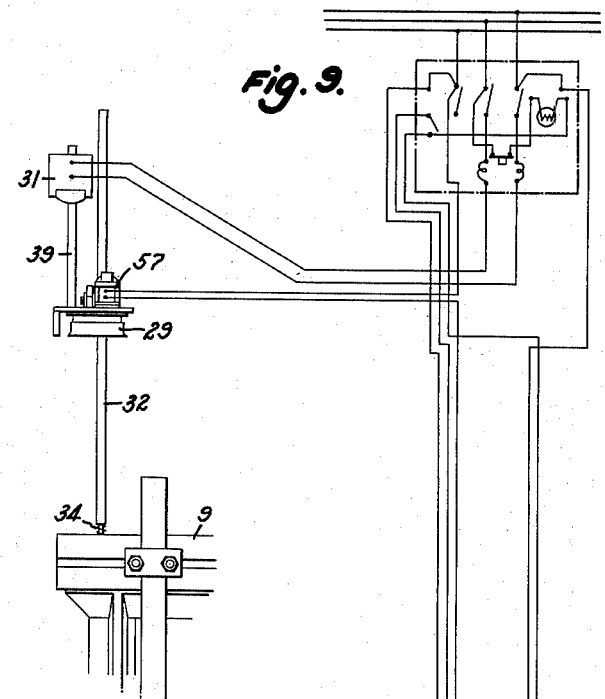
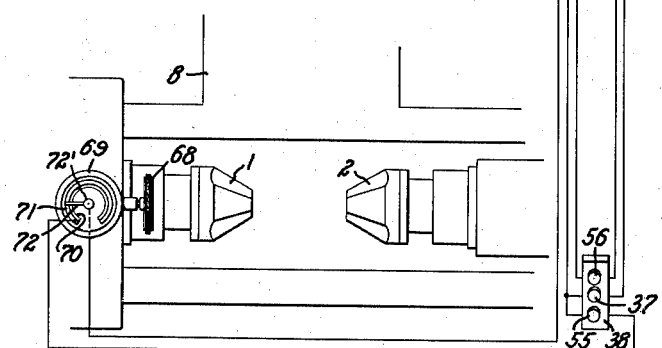
Inventor
George G. Allenbaugh
By W. H. Finckel Jr.
Attorney Patented Dec. 26, 1950

2,535,826

UNITED STATES PATENT OFFICE 2,535,826

INDICATING DEVICE

George G. Allenbaugh, Wadsworth, Ohio, assignor to The Ohio Injector Company, Wadsworth, Ohio, a corporation of Ohio Application April 5, 1946, Serial No. 659,686

5 Claims. (Cl. 33—125)

This invention relates to indicating devices, and it has especial reference to a device for indicating the feed of machine tools, particularly such tools as are fed by means not directly responsive to the operation of the machine with which they are associated, for example by pressure actuated means such as an hydraulic cylinder.

Inasmuch as in any hydraulic system employed for the feeding of machine tools where oil under pressure is circulated as a power medium, and is subject to variations in temperature, and hence in viscosity and flow characteristics, some means must be provided to insure a predetermined constant rate of feed of the cutting tools regardless of changes in flow characteristics of the pressure oil. The rate of feed, whereby the quality of the work and the cutting time are measured, may be controlled by a needle valve which will pass a given volume of oil at a given temperature (say approximately 120° F.) into the power cylinder. After a lapse (say over night) in operation of the apparatus it usually takes several hours of operation for the oil to reach its peak operating temperature, and during this "warming-up period" the needle valve must be adjusted from time to time to maintain a substantially constant rate of feed of the tools. The setting of the valve during this period of adjustment may be read upon a scale associated with the valve as indicated by a pointer or hand turning with the valve stem. For example, this scale may read a quarter segment from "0" to "90," with "22" as the optimum setting of the valve. With oil at 80° F. (say after over-night lapse) the setting would be "45" to give an appropriate predetermined rate of tool feed, whereas with the oil temperature at 120° F. (following the warm-up period, and for normal operation) the same rate of feed will be maintained with the setting of "22."

The feed indicator of the invention is designed to be associated with the tool feeding mechanism of the machine in such a manner that the feed of the tool in relation to a predetermined factor such as a number of revolutions of the work piece, a time interval, or the like may be determined at any time during operation of the machine, so that the needle valve may be properly adjusted, all as will be explained hereinafter more fully and finally claimed.

Figure 6:
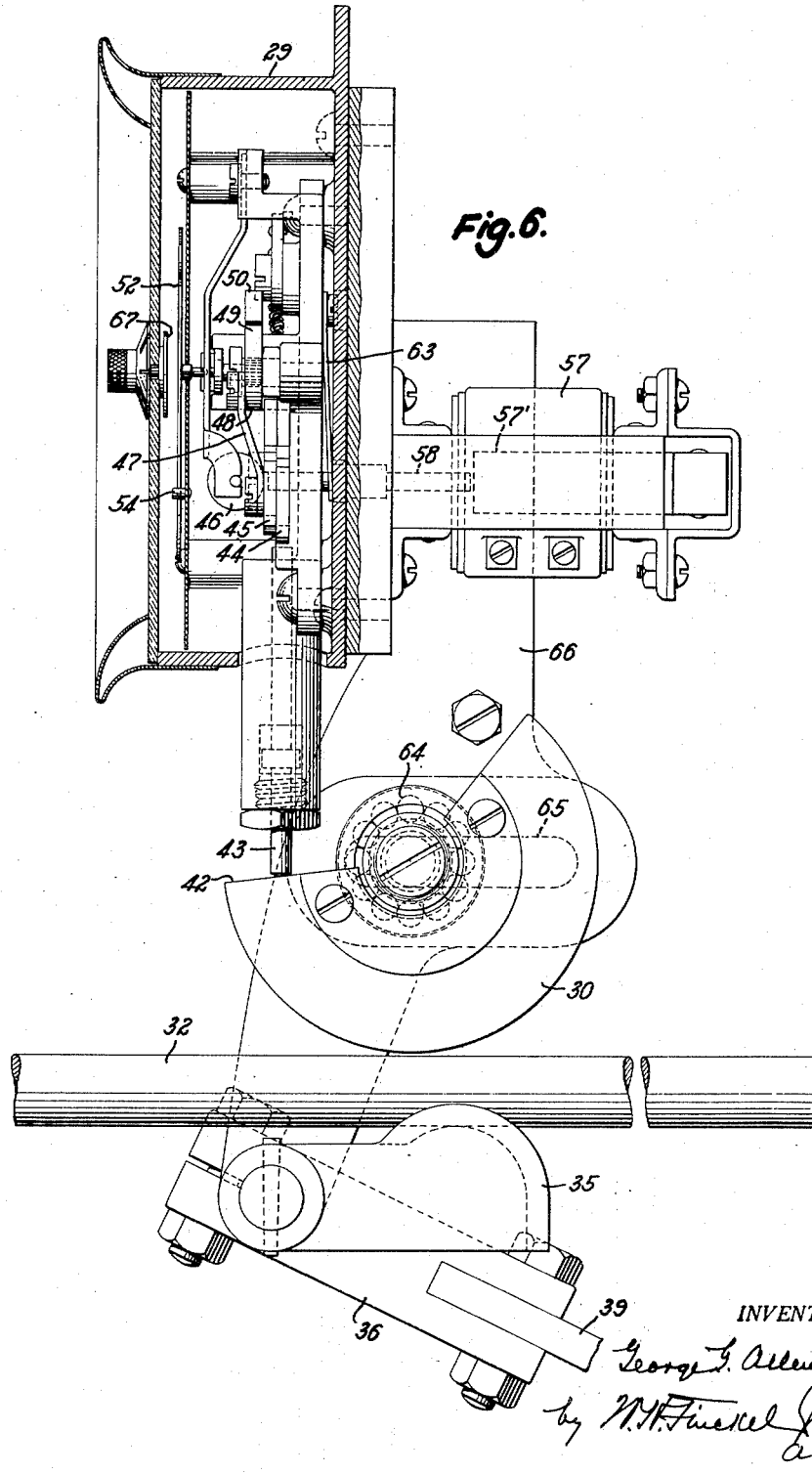
Figure 7:
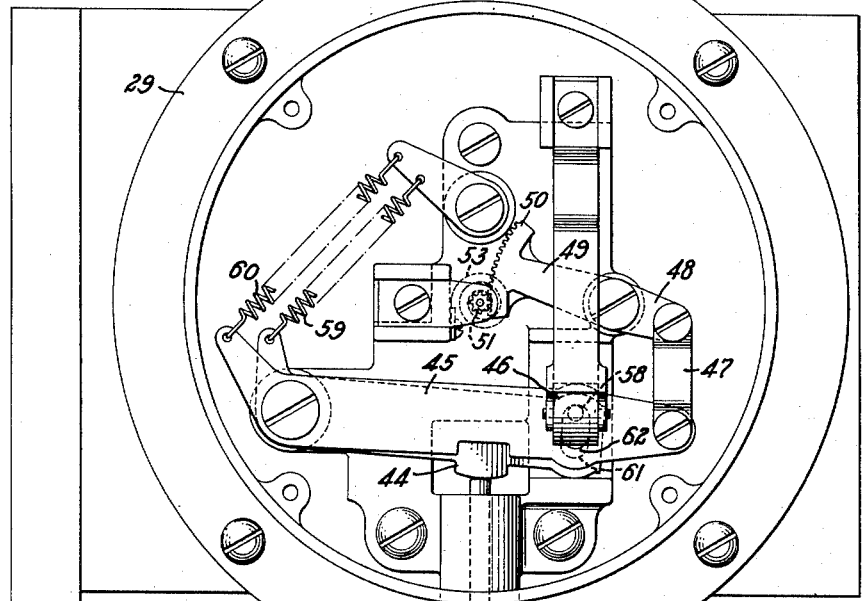
Figure 8:
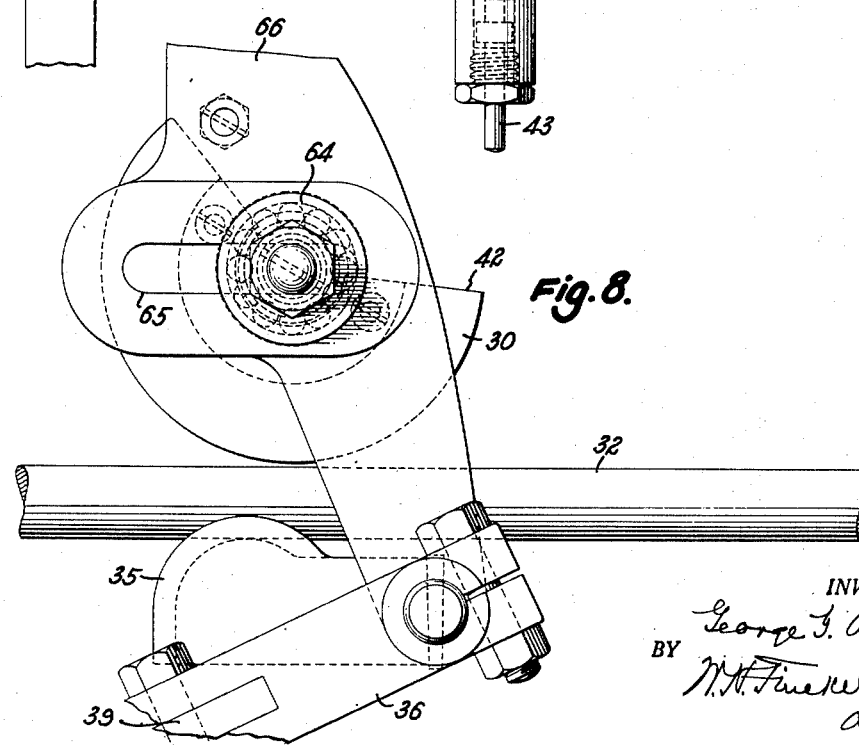

In the accompanying drawings illustrating the invention, in the several figures of which like parts are similarly designated, Fig. 1 is a plan view illustrating the application of the indicating device of the invention to a facing machine, substantially as disclosed in my copending application for patent for Machining Apparatus, filed Feb. 5, 1946, Serial No. 645,638, Fig. 2 is a face view of the dial and indicating hand of the fluid control valve, Fig. 3 is an enlarged fragmentary side elevation, with parts in section, of the rear end of the tool carriage of the machine illustrated in Fig. 1, showing the operative association therewith of the feed indicating device, Fig. 4 is a further enlarged fragmentary sectional side elevation of the flexible connection between the tool carriage and the actuating rod of the feed indicator, Fig. 5 is an enlarged front elevation of the feed indicator and associated operating mechanism, the operating rod being shown in section, Fig. 6 is a enlarged sectional side elevation of the parts shown in Fig. 5, Fig. 7 is an enlarged front view of the feed indicator with the dial, hands and bezel removed to disclose the operating mechanism, Fig. 8 is a fragmentary side elevation of parts of the feed indicator operating mechanism viewed from the side opposite to that shown in Fig. 6, Fig. 9 is a schematic fragmentary plan view illustrating an embodiment of semi-automatic control means for the indicator, and Fig. 10 is a schematic fragmentary elevational view showing another embodiment of semi-automatic control means for the indicator.

In Figs. 1 to 4, wherein the indicating device is shown associated with the tool feeding mechanism of a facing machine of more or less lathe type modified for feeding of the tools by hydraulic pressure operated mechanism substantially in accordance with the invention of my copending application hereinbefore referred to, there is disclosed an embodiment which will suffice to illustrate generally the mode of application and operation of the device of the invention. It will be understood, however, that the device is capable of association with many other kinds of machine tools.

Obviously, the rate of feed of the tools will be adjusted in accordance with the nature and fineness of the final product desired, and hence will depend upon the kind of material machined, the cutting ability of the tools and, in cases where the work is rotated or otherwise moved with respect to the tools, as in the case of a lathe-like machine, milling machine or planer, upon the speed of movement of the work.

In the machine of Figs. 1 to 4 the work is mounted upon the centers of the spindles 1 and 2 rotated in the head stock 3 and tail stock 4 by appropriate drive mechanism through a shaft 5 the speed of which is governed by a conventional transmission mechanism 6. A lateral extension 7 of the machine bed 8 carries the tool carriage 9 fed to the work, and retracted, by the piston rod 10 of an hydraulic cylinder 11 which receives oil through pipes 12 and 13 at its forward and rearward ends, respectively, from a pump 14 under the control of a "fine feed" valve 15 and a "rapid approach" valve 16. The oil is drawn by the pump 14 from a storage tank 17 through a pipe 18, and is returned thereto upon exhaust from the cylinder 11 at pipes 12 and 13 under control of the "fine feed" valve 15 through a pipe 19.

The "fine feed" and "rapid approach" valves 15 and 16, respectively, are manipulated by push-pull rods 20 and 21 connected with operating handle members 22 and 23, respectively, and the rate of flow of the oil from the "fine feed" valve 15 to the rear end of the cylinder 11 may be regulated, and the rate of forward (to the work) feed of the tool carriage, and hence of the tools, controlled by a needle valve 24, already mentioned, the stem of which is fitted for rotation by a shaft 25 provided with a handle 26.

Preferably fixed upon the body of the needle valve 24 is the dial 27, hereinbefore referred to, with which the pointer or hand 28 turning with the valve stem is operatively associated (see Figs. 1 and 2).

By these means it will be apparent that the operator standing at position O may cause the tool carriage and its tools to feed to the work in "fine feed" at any desired rate under the control of the "fine feed" valve 15 and needle valve 24, or may be rapidly advanced to cutting position under the control of the "rapid approach" valve 16, and that its retraction upon completion of the cut may be readily accomplished.

As hereinbefore pointed out, the indicating device of the invention will serve, upon its occasional operation, to apprise the operator of the amount of forward feed of the tool carriage in relation to a predetermined factor such as a number of rotations of the work piece, so that he may appropriately adjust the setting of the needle valve 24.

This indicating device (Figs. 1 and 3 to 8) includes, as main units, an indicator gauge 29 and operating mechanism therefor including a cam device 30 and an actuating solenoid 31, all of which are provided with mechanism whereby feeding movement of the tool carriage 9 is indicated upon the gauge 29 in thousandths of inches, and the reading thus obtained may be correlated by the operator in terms of number of revolutions of the machine spindles, "15" on the gauge indicating .015" an so on up to .300". Of course, any other desired scale designations may be employed as desired.

Referring particularly to Figs. 1, 3 and 4, it will be seen that the cam device 30 is arranged above a somewhat flexible actuating rod 32 connected with the rear end of the tool carriage 9 by a loosely threaded connection 33 (Fig. 4) backed up by a compression spring 34, thus allowing for a certain amount of relative lateral movement while preventing any relative axial movement between the carriage and rod.

In periods of rest the length of the rod 32 is supported in an eccentric bearing member 35 pinned to a pivot shaft having a rotative bearing in the frame of the indicator and provided with an adjustably clamped lever arm 36. The rod is thus supported during such rest periods out of driving contact with the cam device 30, but when it is desired to take readings the starter button 37 of the control switch 38 (Fig. 1) is depressed to energize the solenoid 31 which, through the bar 39 and lever arm 36 raises the bearing member 35 against the actuating rod 32 and forces the rod into frictional engagement with the cam device 30 sufficient, when the tool carriage is feeding, to cause rotation of the cam device. A damper spring 40 is provided, and the extent of opening travel of the solenoid core is limited by means of an adjustable spring-pressed stop plunger 41.

Having reference particularly to Figs. 5 to 8, it will be seen that the step 42 of the cam device 30 bears against the lower end of a plunger pin 43 the upper end of which engages the lug of a lever 44 normally in face-to-face frictional engagement with a lever 45 under the influence of a spring-pressed roller 46. The lever 45 is connected through a link 47 with one end of a substantially centrally pivoted lever 48 the other end 49 of which is provided with a segmented gear 50 meshing with the pinion 51 on the arbor of the indicator hand 52. A hair spring 53 normally acts to bias the indicator hand 52 to position against an appropriate stop 54.

In operation, when the cam device 30 is caused to rotate by movement of the rod 32 in response to feed of the tool carriage, the step 42 will cause the plunger pin 43 to rise carrying with it the lever 44 which, in turn, by frictional engagement, moves with it the lever 45 to cause rotation of the indicator hand 52 through the link 47 and lever-actuated gearing 50, 51.

After a reading has been taken, in a manner later to be explained, the parts may be reset to the inoperative position shown by depressing the stop button 55 of the control switch 38 which will de-energize the solenoid 31 and permit the lever 39 to drop against its stop 41, and, thereafter, in order to reset the indicator hand 52 to its zero position, the reset button 56 of the switch 38 is depressed to energize a solenoid 57 at the back of the indicator gauge 29, so that the core 57' of this solenoid will press against one end of a trip pin 58 and shift the pin axially with the result that its other end will press the roller 46 away from lever 45 and thereby release the frictional engagement of this lever with the lever 44, whereupon the levers 44 and 45 will be returned to normal, at rest, position under the influence of their respective return springs 59 and 60, the indicator hand 52 meanwhile being returned against the stop 54 by the action of the gearing 50, 51 and the hair spring 53. It will be noted that the levers 44 and 45 are provided with mating apertures 61 and 62, respectively, for passage therethrough of the trip pin 58. A spring 63 (Fig. 6) normally holds the trip pin out of engagement with the roller 46 and in operative relation with respect to the core 57' of the solenoid 57.

When, during operation of the machine, the operator wishes to check the rate of feed of the tool carriage, he first presses the stop button 55 of the control switch 38 to make sure that the solenoid 31 is de-energized. Then, with the centers of the spindles 1 and 2 of the machine loaded with a piece to be machined and running in "fine feed" by appropriate setting of the control handle member 22 of the feed control valve 15, he presses the reset button 56 of the control switch 38 to insure that the indicator hand 52 is against the stop 54 and the other parts of the indicator gauge mechanism are returned to normal position.

He then presses the starter button 37 of the control switch 38 to energize the solenoid 31 and establish driving engagement of the parts including the cam device 30, rod 32 and bearing member 35, and thereafter again presses the reset button 56 and holds it until the piece rotating with the machine spindles 1 and 2 reaches some arbitrary point easily noted, whereupon the reset button is immediately released. During this actuation of the reset button the function of the frictional driving engagement of the levers 44 and 45 becomes effective. If the step 42 were permitted to strike the pin 43 with the levers 44 and 45 in frictional driving engagement under the influence of the spring-pressed roller 46, a sudden jolt would be imparted to the lever 45 and to the indicator hand 52, and an incorrect reading would result. But when, under the influence of operation of the reset button, the roller 46 is released from, and then restored to, contact with the lever 45, this lever will be smoothly engaged by the lever 44 and the reading taken will be accurate. On completion of ten revolutions of the centers the stop button 55 is pressed.

Obviously, the amount of travel of the tool carriage which has taken place during the ten revolutions of the work piece will be indicated by the indicator hand 52, and the operator can thereby read directly upon the scale of the dial plate, in thousandths of an inch, the distance travelled by the tool carriage during ten revolutions of the machine spindles; and, by simple division, can determine the distance travelled during one rotation of the work piece.

The rotative bearing 64 of the cam device 30 is adjustably mounted in a slot 65 of its bearing bracket 66 so that it may be shifted to bring any desired effective area of its step 42 into operative engagement with the plunger pin 43, thus making possible calibration of the mechanism to give a direct dial reading in thousandths of an inch of tool travel.

In checking the rate of tool feed, supposing that the operator desires to feed at the rate of .007″ per revolution of the machine spindles, he will set the pilot hand 67 (Figs. 5 and 6) of the gauge 29 at "70" on the dial scale, and then when he takes a reading, in the manner just described, ten revolutions of the spindles should cause the indicator hand 52 to register at "70" with the pilot hand 67. If the indicator hand goes beyond or falls short of "70," the needle valve 24 will be closed or opened more accordingly.

During the "warming-up period," hereinbefore referred to, readings relative to the tool feed can be taken frequently and the needle valve 24 adjusted to keep the tools feeding correctly within reasonably close limits.

It will be understood that the pressure of the roller 46 against the levers 44 and 45 serves not only to provide driving frictional engagement between these levers but will hold them against the mounting plate of the gauge mechanism with sufficient friction to maintain any reading of the indicator hand 52 until the reset mechanism is operated, the return springs 59 and 60 being merely of a strength thereafter to return the parts to normal position.

In hereinbefore referring to the counting of ten revolutions of the machine spindles 1 and 2 during operation of the indicator mechanism to take a reading relative to the tool feed, visual counting of the revolutions is intended, and this is possible in the case of machines where the rotation or other movement imparted to the work during the machining operation is slow enough to be readily observed. However, where such rotation or other movement is too rapid for visual observation some mechanical or electrical means may be resorted to for determining the periods of actuation of the indicating device in response to movement of the work, and electrical means may be included in such arrangement for energizing and de-energizing the actuating means of the indicating device responsive to the periods thus determined.

In Fig. 9 such an arrangement is shown in combination with parts of a machine similar to that shown in Fig. 1, but in which it may be assumed that the speed of rotation of the spindles 1 and 2 is too rapid for visual counting. As shown, considering that the spindles are rotating, it will be assumed that when the starter button 37 of the switch 38 is pressed the drive roller 68 of a rotation counter 69 is preferably automatically brought into driven engagement (by means not shown) with a part of the rotating spindle.

The scale 70 of this rotation counter may be divided to show full rotations and fractions thereof from "0" to any appropriate number, and an arcuate plate contact member 71 will be so mounted that a combined indicator hand and contact member 72 may be adjusted by a turn button 72′ to any desired point on the scale depending upon the number of rotations of the spindles to be counted prior to de-energizing the indicating device, say ten revolutions as hereinbefore explained as proper for use of the scale on the dial of the indicator gauge of Fig. 5.

The combined indicator hand and contact member 72 and the arcuate contact plate 71 are shown as in circuit with the stop button 55 of the switch, and the hand 72 is driven counter-clockwise by the mechanism of the rotation counter. Hence after adjustment of the hand 72, and pressing the starter button 56, the solenoid 31 which controls operation of the indicating device will remain energized until the hand 72 runs off of the contact plate 71, thereby breaking the circuit.

In other types of machine tools with which the indicating device may be associated, where the work is held stationary and the tools are advanced to the work, such as a drill press, other kinds of mechanical or electrical devices may be employed for determining the interval during which the indicating device will be energized for taking a reading relative to the tool feed. Obviously, in the association of the indicating device with such a machine tool the rate of tool feed must be measured in a ratio of distance to time rather than of distance to movement of the work as last described.

Fig. 10 shows an arrangement based upon this ratio of distance to time in which the machine tool is a multiple spindle drill press the tool carrying spindle head 73 of which advances the tools, drills 74, to the work fixedly mounted upon the usual bed or platform, not shown.

In circuit with the stop button 55 of the switch 38, which controls the operation of the indicating device, is a timing device 75 the dial of which may be divided to show seconds and fractions thereof, and on this dial is mounted an arcuate contact plate 76 over which rides a combined indicator hand and contact member 77 capable of being adjusted with relation to the dial by a turn button 77′. This hand 77 is rotated counter-clockwise by the mechanism of the timing device 75 and is adapted in a manner similar to that of the corresponding parts 71 and 72 of Fig. 9 to open the circuit of the stop button 55 through the solenoid 31.

The indicator gauge 29 and the relatively fixed parts associated therewith, including the solenoid 31 may be conveniently mounted upon the stand 78 of the drill press, and the rod 32 is connected to the spindle head 73 for movement therewith.

By this arrangement it will be apparent that the distance travelled by the spindle head in a predetermined time interval as determined by the setting of the hand 77, as the drills are fed to the work, will be indicated upon the dial of the indicator gauge 29, it being understood, of course, that feeding movement of the head 73, and counter-clockwise travel of the indicator hand 77 from a selected time point on the contact plate 76 of the dial of the timing device 75, are started simultaneously.

If desired, automatic means in circuit with the starter and reset buttons 37 and 56, respectively, of the switch 38, may be employed for controlling the starting and resetting movements of the indicator hand 77.

An arrangement similar to that of Fig. 10 may be employed in association with the travelling work-carrying beds of milling machines and planers.

From the foregoing it will be apparent that the indicating device of the invention will function to enable the operator to determine the rate of feed between the tools and the work, no matter which is fed, with relation to a work-progress factor, whether such factor be a number of rotations or the like, or a time interval.

Various changes and modifications are considered to be within the principle of the invention and the scope of the following claims.

What I claim is:

1. A device to indicate the cutting progress of the tool means of a machine tool as determined by the relative feeding movement between the tool means and a work piece, including an indicator gauge and gauge actuating means one of which is movable relatively to the other in response to relative movement of the work piece and tool means, said gauge being provided with an indicator hand and operating mechanism therefor including oscillatable lever means, reciprocable means for imparting oscillating movement to said lever means, a rotative member having a cam step for engagement with said reciprocable means, said gauge actuating means including means for imparting rotation to said rotative member in response to the said relative movement of the work piece and tool means, and manually operable means for establishing and releasing engagement between said rotative member and said rotation imparting means during relative movement of the work piece and tool means, said manually operable means including lever means normally supporting said rotation imparting means out of contact with said rotative member, and means for moving said lever means to establish rotation imparting engagement of said rotative member and said rotation imparting means.

2. A device for indicating the cutting progress of the tool means of a machine tool as determined by the relative feeding movement between said tool means and a work piece, including an indicator gauge having a dial and an indicator hand for movement over said dial, an actuating rod longitudinally movable with respect to said gauge in response to said relative feeding movement, means for imparting movement to said hand in response to movement of said rod including a pair of levers one of which is normally in frictionally driven engagement with the other, a reciprocative member in operative association with said other lever, a rotative member having a cam step operatively engaging said reciprocative member for imparting reciprocative movement thereto and to said lever members under the influence of said rotative member, means for normally supporting said rod out of engagement with said rotative member, and means for causing said supporting means to engage said rod with said rotative member during said relative movement.

3. Apparatus as claimed in claim 2, in which means are provided for normally holding said levers in frictionally driven engagement, and manually operable control means for the holding means.

4. Apparatus as claimed in claim 2, in which means are provided for normally holding said levers in frictionally driven engagement, said levers being provided also with spring return means, and means operable manually to release said frictionally driven engagement and permit operation of said spring return means.

5. Apparatus as claimed in claim 2, in which the frictionally driven lever is operatively connected with said indicator hand and is engaged by pressure imparting means for holding it in frictionally driven engagement with the other lever, manually operable means for releasing said pressure imparting means, and means manually operable to actuate the means for causing engaging and disengaging movement of said rod and rotative means.

GEORGE G. ALLENBAUGH.

REFERENCES CITED

The following references are of record in the file of this patent:

UNITED STATES PATENTS

| Number | Name | Date |
|---|---|---|
| 1,015,305 | Fentzloff | Jan. 23, 1912 |
| 1,157,800 | Oslund | Oct. 26, 1915 |
| 1,390,432 | Douglass | Sept. 13, 1921 |
| 2,018,217 | McNamee | Oct. 22, 1935 |
| 2,209,584 | Somerville | July 30, 1940 |
| 2,406,793 | Benkoe | Sept. 3, 1946 |

FOREIGN PATENTS

| Number | Country | Date |
|---|---|---|
| 62,235 | Denmark | May 8, 1944 |